United States Patent
Docken et al.

(10) Patent No.: US 7,240,473 B2
(45) Date of Patent: Jul. 10, 2007

(54) LAWN MOWER AND STARTER CORD GUIDE FOR USE WITH SAME

(75) Inventors: Kevin D. Docken, Chanhassen, MN (US); Joseph S. Sauvageau, Bloomington, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 11/077,600

(22) Filed: Mar. 11, 2005

(65) Prior Publication Data

US 2006/0201125 A1   Sep. 14, 2006

(51) Int. Cl.
*A01D 67/00* (2006.01)

(52) U.S. Cl. ............... 56/320.1; 56/16.7; 56/DIG. 18; 56/1; 242/404.3

(58) Field of Classification Search ............ 56/1, 56/16.7, DIG. 18, 320.1; D8/356; 242/404.2, 242/404.3
See application file for complete search history.

(56) References Cited

U.S. PATENT DOCUMENTS

| | | | | |
|---|---|---|---|---|
| 1,842,743 A | * | 1/1932 | Brackett | 40/644 |
| 2,720,560 A | * | 10/1955 | Funk | 191/12.2 R |
| 2,721,711 A | * | 10/1955 | Torzewski | 242/400.1 |
| 2,912,966 A | * | 11/1959 | Mitchell | 123/185.3 |
| 3,271,057 A | * | 9/1966 | Kimbro | 403/258 |
| 4,159,614 A | * | 7/1979 | Thomas et al. | 56/11.6 |
| 4,458,472 A | | 7/1984 | Christopherson | |
| 4,958,483 A | | 9/1990 | Heismann | |
| 5,033,258 A | * | 7/1991 | Morse | 56/2 |

OTHER PUBLICATIONS

U.S. Appl. No. 10/942,427, filed Sep. 16, 2004, Stover et al.

* cited by examiner

*Primary Examiner*—Thomas B. Will
*Assistant Examiner*—Alicia Torres
(74) *Attorney, Agent, or Firm*—Mueting, Raasch & Gebhardt, P.A.

(57) ABSTRACT

A walk-behind lawn mower having a cord guide system for routing a recoil starter cord relative to a handle assembly of the mower. The guide system may include a cord guide operable to hold the starter cord to a non-interfering position such that a rear collection hopper can be easily removed from the lawn mower for dumping of collected grass clippings. The cord may be moved from the non-interfering position back to a starting position by application of a pulling force to the cord.

18 Claims, 5 Drawing Sheets

LAWN MOWER AND STARTER CORD GUIDE FOR USE WITH SAME

TECHNICAL FIELD

The present invention relates generally to powered walk-behind implements and, more particularly, to a guide system for temporarily routing a recoil starter cord relative to a handle assembly of a walk-behind lawn mower.

BACKGROUND

Rotary lawn mowers for cutting grass or other ground surface vegetation are well known. Typically, these mowers include a housing having an enclosed cutting chamber, and wheels that permit travel of the housing over the ground surface. A cutting blade may be supported within the cutting chamber for rotation in a substantially horizontal cutting plane. During operation, the rotating cutting blade severs grass and other vegetation over which the mower passes.

To permit a walking operator to guide and manipulate the mower, a handle assembly is generally provided to the rear of the housing. The handle assembly typically forms a U-shaped apparatus that includes two spaced-apart handle tubes joined together at their respective upper ends by a cross tube. The handle assembly may substantially lock, relative to the housing, during operation so that the operator may impart directional and control forces to the mower.

Modern mowers may also incorporate a collection hopper to permit bagging of grass/vegetation clippings. While some mowers utilize a side attached bag, others provide a rear bagging configuration to reduce the overall width of the mower. In the case of the latter, the collection hopper may be located generally between the handle tubes.

In most mower configurations, an internal combustion engine attaches to an upper surface of the housing to power the cutting blade. The engine typically includes a vertical drive shaft that extends downwardly through the housing and into the cutting chamber where it attaches to the blade. In some mowers, a transmission may also be coupled to the drive shaft to power one or more of the mower wheels.

The engine may incorporate a recoil starter as known in the art. Recoil starters provide a retractable rope or cord attached, at a first end, to a crank of the engine and, at a second end, to a T-shaped grip or the like. To start the engine, the operator simply applies a sufficient pulling force to the grip.

In some configurations, the starter rope is conveniently positioned such that it is accessible to the operator while he or she is standing behind the mower. That is, the starter rope may extend from the engine's recoil starter to a bracket mounted on the handle assembly. The bracket may hold the grip in a position that is easily accessible to the operator while standing behind the mower.

Although effective, when the starter rope is routed in this fashion, it extends over the space between the two handle tubes, e.g., over the collection hopper. As a result, the rope may potentially interfere with removal/emptying of the hopper.

One mower that seeks to alleviate this issue is disclosed in U.S. Pat. No. 4,458,472 to Christopherson. This mower utilizes, in one embodiment, a pull grip that may be easily disconnected from the bracket. Accordingly, the rope may be moved to a non-interfering position prior to emptying of the collection hopper.

However, while effective for their intended purpose, the mowers described by the '472 patent may require the operator to reconnect the starter rope to the bracket after reattachment of the hopper.

SUMMARY

The present invention may overcome these and other issues. For example, in one embodiment, a lawn mower is provided having a movable housing with a prime mover, wherein the prime mover includes a starter having a flexible cord attached thereto. The mower also includes a handle assembly extending upwardly and rearwardly from the housing, the handle assembly including a transversely offset handle member. Also provided is a bracket coupled to the handle member, and cord guide coupled to the handle member between the starter and the bracket. The cord is movable from a first configuration, wherein the cord contacts the cord guide, to a second configuration, wherein the cord bypasses the cord guide and extends substantially directly between the bracket and the starter.

In another embodiment, a lawn mower is provided that includes a movable housing. The housing has a prime mover operable to power a cutting element supported by the housing, wherein the prime mover includes a starter having a starter cord. A handle assembly extending upwardly and rearwardly from the housing is also provided. The handle assembly includes transversely offset first and second handle members. A vertically-displaceable collection hopper is also included and positioned between the first and second handle members. A bracket coupled to the first handle member is provided, as is a cord guide coupled to either the housing or the first handle member between the bracket and the starter. The cord is movable between a first configuration, wherein the cord extends around the cord guide between the starter and the bracket, and a second configuration, wherein the cord extends above the collection hopper substantially directly between the starter and the bracket.

In yet another embodiment, a lawn mower is provided that includes a movable housing. The housing has a prime mover operable to power a cutting element supported by the housing, wherein the prime mover further includes a starter having a starter cord. Also included is a handle assembly extending upwardly and rearwardly from the housing, wherein the handle assembly includes spaced-apart first and second handle members. A vertically-displaceable collection hopper is positioned between the first and second handle members. A bracket coupled to the first handle member is provided, as is a cord guide coupled to the first handle member between the bracket and the starter. The cord, when in a first configuration, is operable to engage the cord guide such that the cord does not interfere with vertical movement of the collection hopper, and, when in a second configuration, is operable to extend over the collection hopper between the bracket and the starter.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The present invention will be further described with reference to the figures of the drawing, wherein.

Figure 1:
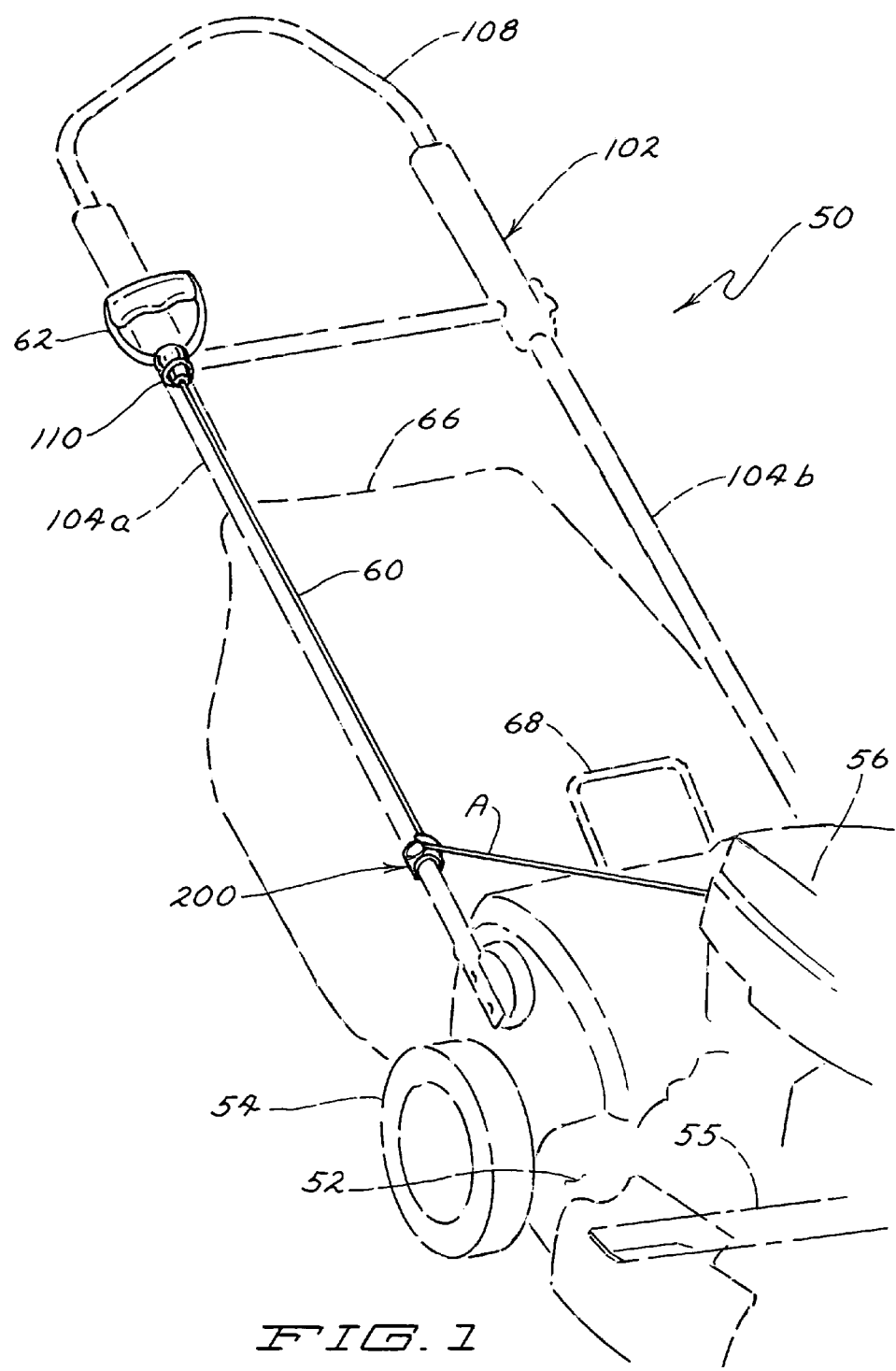
FIG. 1 illustrates a lawn mower incorporating a starter cord and cord guide in accordance with one embodiment of the invention, the cord shown in a first configuration.

The figures are rendered primarily for clarity and, as a result, are not necessarily drawn to scale.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the present invention.

The present invention is directed to walk-behind implements, such as lawn mowers, having a housing and a working member (e.g., cutting line or blade) operatively coupled to the housing. The working member may be powered by a prime mover (e.g., engine) fixed to the housing. The engine, in turn, may incorporate a recoil starter having a flexible starter cord attached thereto as is known in the art. The starter cord may extend from the engine to a portion of a handle assembly, which extends rearwardly from the mower, such that the cord is easily accessible to the operator during mower operation.

A cord guide in accordance with one embodiment of the invention may permit routing of the starter cord in at least two configurations relative to the handle assembly. For example, the cord may be placed in an operating configuration for starting the engine and operating the mower and, subsequently, moved to another configuration for removal and emptying of a rear-mounted collection hopper. In some embodiments, the cord may be returned to the operating configuration merely by application of a pulling force to the starter cord.

While described herein in the context of a walk-behind rotary lawn mower, those of skill in the art will appreciate that the apparatus and methods of the present invention could be used with most any walk-behind implement including, for example, reel mowers, lawn vacuums, sweepers, and other ground or floor working equipment.

Horizontal, vertical, and other similar terms may be used herein to identify general directions and/or orientations of various parts and assemblies. It is to be understood that these terms are not necessarily absolute, e.g., horizontal (or vertical) may be used to indicate an element that is substantially horizontal (or vertical).

Moreover, relative terms such as left, right, forward, rearward, top, bottom, upper, lower, horizontal, vertical, and the like may be from the perspective of one operating a mower. These terms are used herein to simplify the description, however, and not to limit the scope of the invention in any way.

Referring to FIG. 1, an exemplary handle assembly of a walk-behind rotary lawn mower 50 is generally indicated by reference numeral 102. Attached to the handle assembly 102 is a cord guide system 200 in accordance with one embodiment of the present invention.

The handle assembly 102 may form a generally U-shaped structure that includes a lower section defined by a first and a second handle member, e.g., upwardly extending, spaced-apart handle members 104a and 104b. An upper section of the handle assembly 102 may include a generally transverse gripping portion 108 operable to receive hands of an operator during mower use. The handle assembly 102 may also include operator controls such as throttle (not shown) and blade and/or drive control bales (also not shown).

The mower 50 may further include a housing 52 having ground engaging members such as wheels 54 (only one shown in FIG. 1), the latter to allow rolling movement of the housing 52 over a ground surface. A working member, e.g., rotatable cutting element 55 or blade, may rotate within a cutting chamber defined by an underside of the housing 52. The cutting element 55 may sever grass or other vegetation at a pre-determined height above the ground during operation.

A prime mover, e.g., internal combustion engine 56, may be attached to an upper surface of the housing 52. The engine 56 may include a drive shaft that extends downwardly through the housing 52 and into the cutting chamber, where it attaches to the cutting element 55 to provide rotational power to the same. Optionally, the drive shaft may also provide driving power to one or more of the wheels 54 to propel the mower 50 during operation.

In some embodiments, the handle assembly 102, housing 52, and other parts of the mower 50 may be identical, or substantially similar, to the corresponding components described in U.S. patent application Ser. No. 10/942,427, entitled WALK-BEHIND IMPLEMENT AND HANDLE SYSTEM FOR USE WITH SAME, filed Sep. 16, 2004.

The internal combustion engine 56 may incorporate a recoil starter 58 (see FIG. 2) as is generally known in the art. The recoil starter 58 may include a flexible starter cord, e.g., rope 60, extending therefrom and terminating at a distal or terminal end with a pull grip 62. When the operator imparts a sufficient pulling force 64 to the pull grip 62/rope 60 (see FIG. 2), combustion may initiate and the engine 56 may start.

The mower 50 may further include a rear bagger or collection hopper 66 fluidly coupled to the cutting chamber via a duct formed in the housing 52. The collection hopper 66 permits the collection of grass clippings and other vegetation cut by the cutting element 55 during mower operation. When the hopper 66 becomes full, the engine 56 may be stopped and the hopper 66 manually removed from the housing 56 in accordance with the methods described below. Once emptied, the hopper 66 may be reattached to the housing and the mower engine restarted.

Figure 2:
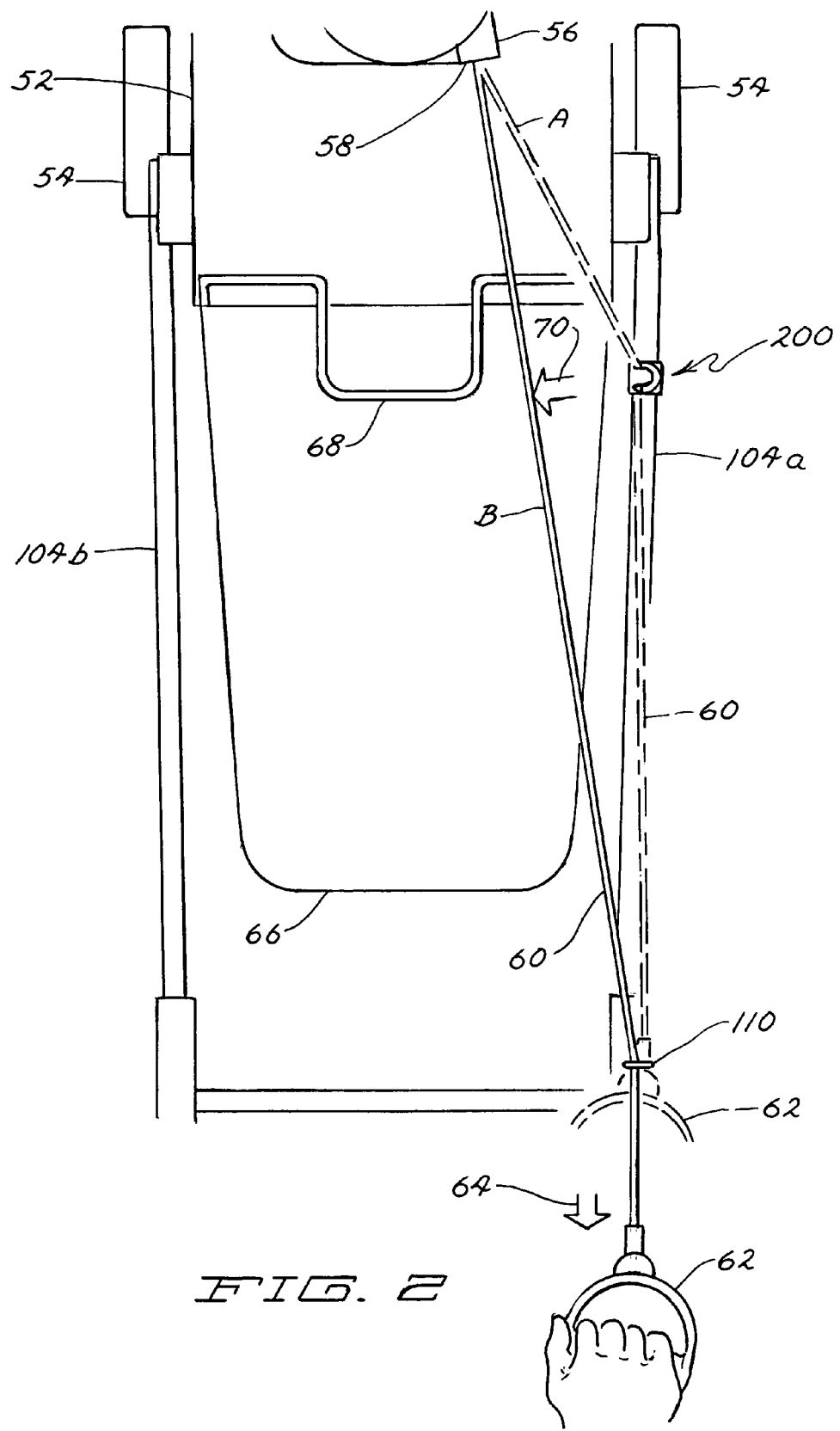
FIG. 2 is a top plan view of a portion of the mower of FIG. 1 illustrating the cord in both the first configuration (broken line representation) and a second configuration (solid line representation)

In the illustrated embodiments, the mower is a rear-bagging configuration, i.e., the collection hopper 66 is mounted rearwardly of the housing 52. The collection hopper 66 may mount to the rear of the housing 52 such that the hopper is positioned generally between the transversely offset handle members 104a and 104b as illustrated in FIGS. 1 and 2. Although not illustrated, the mower 50 could utilize different handle assemblies, e.g., a single transversely offset handle member, without departing from the scope of the invention.

The cord guide system 200 may include both a pull grip bracket 110 and a cord guide 202. The pull grip bracket 110 may be a separate component that is subsequently attached, e.g., welded, to the handle member 104a, e.g., near an upper portion of the handle member. Alternatively, the bracket 110 could be constructed and attached via fasteners in a manner substantially similar to the rope guides described in U.S. Pat. No. 4,958,483 to Heismann.

Figure 3:
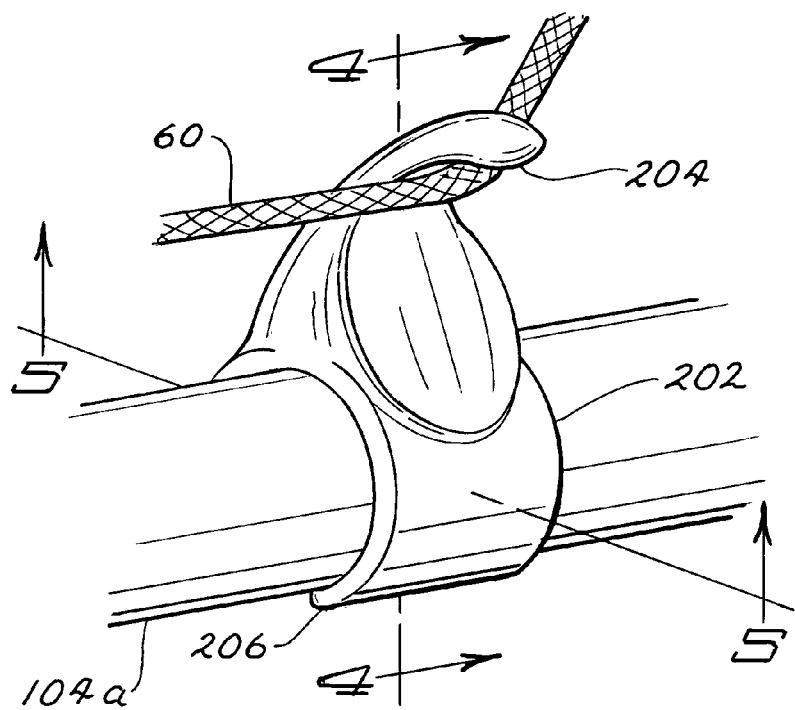
FIG. 3 is an enlarged perspective view of the exemplary cord guide of FIGS. 1 and 2.
Figure 4:
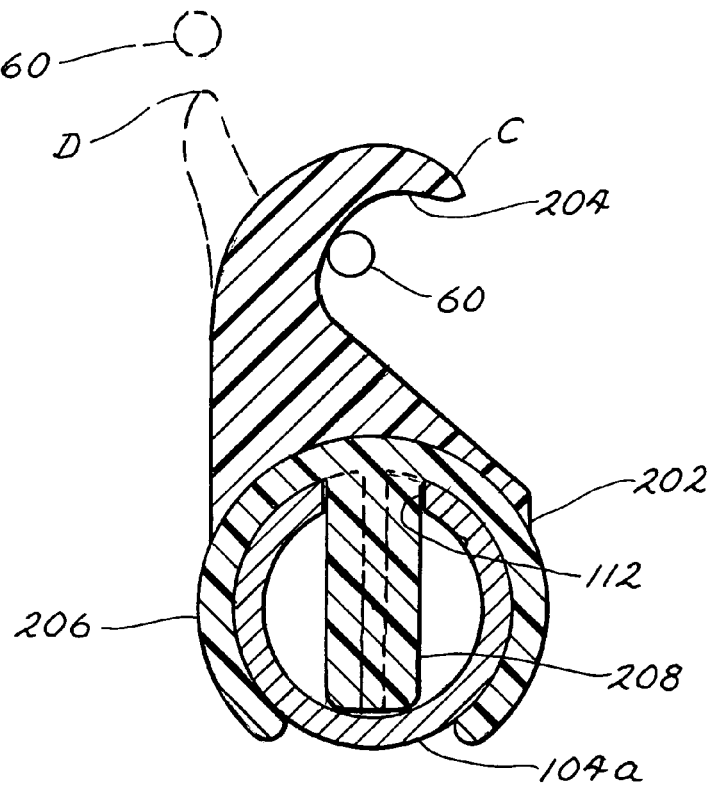
FIG. 4 is a cross-sectional view of the cord guide of FIG. 3 taken along line 4—4.
Figure 5:
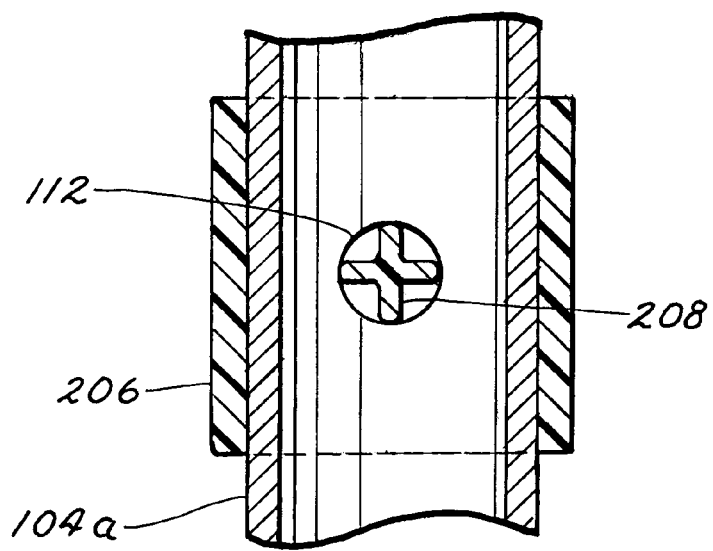
FIG. 5 is a cross-sectional view of the cord guide of FIG. 3 taken along line 5—5.

The cord guide 202 is shown in more detail in FIGS. 3, 4, and 5. As illustrated in these figures, the cord guide 202 may attach to the mower, e.g., to the handle member 104a, at a location generally between the bracket 110 and the starter 58. In the illustrated embodiment, the cord guide 202 is coupled to the handle member 104a at an elevation below that of the bracket (see FIG. 1).

While illustrated herein as attaching to the handle member, other embodiments in accordance with the present invention may attach the cord guide to another portion (e.g., the engine) of the mower without departing from the scope of the present invention. In fact, the cord guide may be attached to any structure that permits selective routing of the cord to a non-interfering configuration as further described below.

The cord guide 202 may form an open-sided hook member having a catch portion 204 operable to selectively and temporarily hold the cord 60 in a first configuration "A" as shown in FIGS. 1 (solid line representation) and 2 (broken line representation). When desired, e.g., when the operator wishes to start the engine 56, the cord 60 may be released from the cord guide 202 and moved to a second configuration "B" as shown in FIG. 2 (solid line representation).

In the first configuration A, the cord 60 may extend around, e.g., contact, the cord guide 202 between the bracket 110 and the starter 58. However, in the second configuration B, the cord 60 may bypass the cord guide 202 such that the cord extends generally between the bracket 110 and the starter 58, e.g., above the collection hopper.

The cord guide 202 may, in one embodiment, be made of a generally resilient and compliant material, e.g., molded plastic. As a result, the guide 202 (e.g., the catch portion 204), may be sufficiently stiff to maintain its hook shape (as represented by position C in FIG. 4) and statically support the cord 60 in the first configuration A (see FIGS. 1 and 2). However, the guide 202 may be able to deflect (as represented by position D in FIG. 4) to release the cord 60 when desired. In one embodiment, the catch portion 204 of the cord guide 202 may deflect as shown in FIG. 4 when the cord is tightened, e.g., when the operator applies the pulling force 64 to the pull grip 62 (see FIG. 2).

In the embodiment illustrated in FIGS. 3 and 4, the cord guide is molded from two separate materials in a two-shot mold process. For example, a first or base portion 206 of a first material (e.g., polypropylene) may be molded. The base portion 206 may then be overmolded with a second material (e.g., an elastomer, such as Santoprene thermoplastic of durometer 80 Shore D produced by Advanced Elastomer Systems, LP, of Akron, Ohio, USA) to form the catch portion 204. The first and second materials/molding processes may be selected to ensure that the catch portion 204 has greater compliance than the underlying first material of the base portion 206.

The relatively more rigid first material of the base portion 206 may permit secure attachment of the cord guide 202 to the handle member 104a. For example, the base portion 206 may form a C-shape that substantially surrounds the handle member 104a as shown in FIG. 4. To reduce or eliminate rotation of the guide 202 about the handle member 104a, the base portion 206 may further include a protrusion 208 operable to seat within an opening 112 formed in the handle member 104a. In one embodiment, the protrusion 208, as shown in FIG. 5, is configured to have a "+" shaped cross-section, and the receiving opening 112 in the handle member 104a may have a corresponding circular shape when viewed along an axis of the opening. However, these shapes are exemplary only and other embodiments may utilize other shapes to accomplish the same objective without departing from the scope of the invention. Alternatively, cord guides in accordance with other embodiments of the invention may attach to the handle member 104a in other ways, e.g., fasteners, adhesives, welding, etc.

While described as having a catch portion 204 that deflects, the cord guide could be configured in other ways. For example, the catch portion 204 could be relatively rigid yet biased, e.g., spring-loaded, towards the position C (FIG. 4) by a torsion spring or a resilient base portion. In still other embodiments, the cord guide 202 could be a relatively rigid member that is not intended to deflect when the rope 60 is pulled, i.e., the rope could be manually engaged and disengaged from the cord guide. Thus, the illustrated configuration is exemplary only and other cord guides that permit selective holding of the starter cord in the first configuration are certainly possible without departing from the scope of the invention.

The cord 60 may normally be in the second configuration B (see FIG. 2) during mower operation. Once the hopper 66 becomes filled with clippings, the mower 50 (engine 56) may be stopped using operator controls (not shown). To empty the hopper 66, it may be grasped by the operator, e.g., using a handle 68 (see FIGS. 1 and 2), and vertically lifted through the space defined between the handle members 104a and 104b.

Prior to lifting the hopper 66, the operator may grasp the cord 60 and move it from the second configuration B to the first configuration A (see FIG. 2). This reconfiguration may be accomplished by manually grasping the cord 60 in the proximity of the guide 202 and pulling enough cord slack from the recoil starter 58 to permit hooking of the cord 60 over the catch portion 204 of the guide as shown in FIGS. 2 and 3. As described above, the guide 202 is preferably capable of holding the cord 60 in the first configuration A during the hopper removal/replacement process.

Once the cord 60 is engaged with the guide 202, the hopper 66 may be lifted vertically between the handle members 104a and 104b without interference from the cord 60 as would be apparent if the cord were to remain in the second configuration B (see FIG. 2).

When emptied, the hopper 66 may be reattached to the housing 52 by lowering the hopper through the space between the handle members 104a and 104b. Once again, the cord 60 may remain in the non-interfering first configuration A during hopper reattachment.

When the hopper 66 is reattached to the housing 52, the operator may return to the operating position at the rear of the handle assembly 102. To restart the engine 56, the operator may grab the pull grip 62 and apply the pulling force 64 as depicted in FIG. 2. As the force 64 is applied, the cord 60 applies an inward force (in the direction indicated by reference numeral 70 in FIG. 2) to the catch portion 204 of the guide 202. The force 64 preferably causes the catch portion 204 to bend from position C towards position D (see FIG. 4) until the cord 60 is released by the guide 202, at which point the cord may return to the position defined by the second configuration B. Further pulling of the pull grip 62 may result in direct actuation of the starter 58 without frictional resistance resulting from indirect cord routing around the guide 202.

Figure 6:
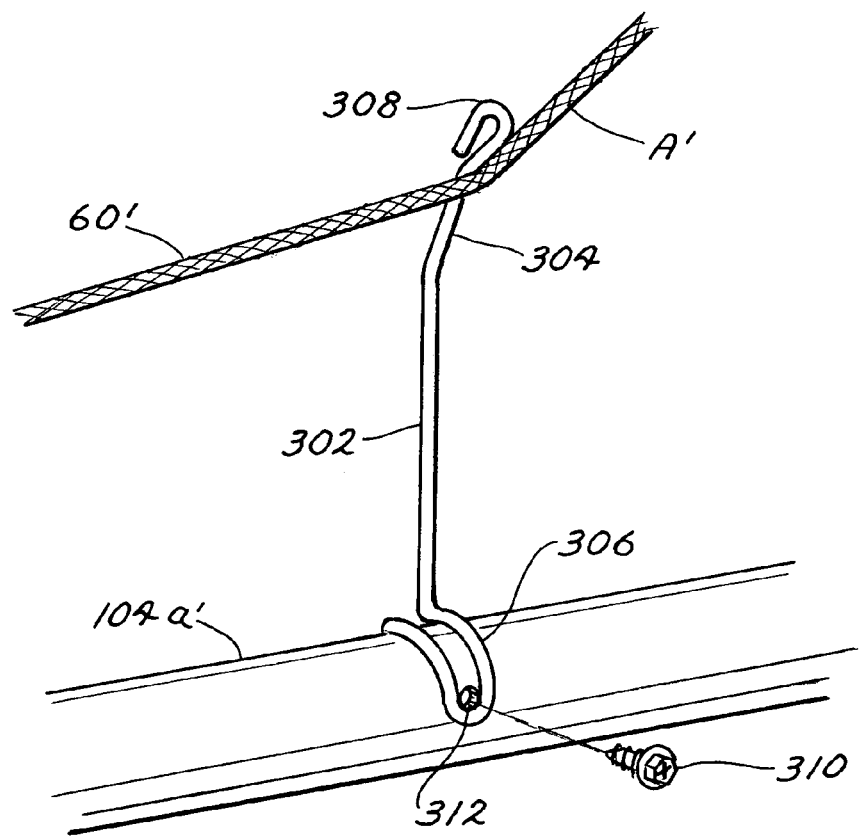
FIG. 6 is a perspective view of a cord and cord guide in accordance with another embodiment of the invention, wherein the cord is shown in a first configuration.
Figure 7:
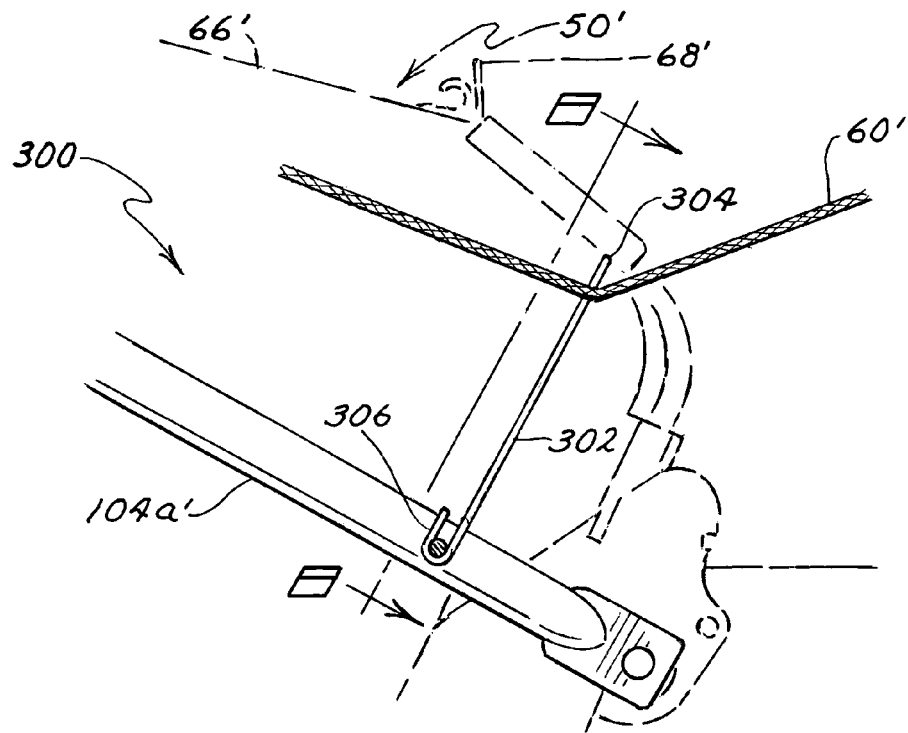
FIG. 7 is a side elevation view of a lawn mower incorporating the cord guide of FIG. 6.
Figure 8:
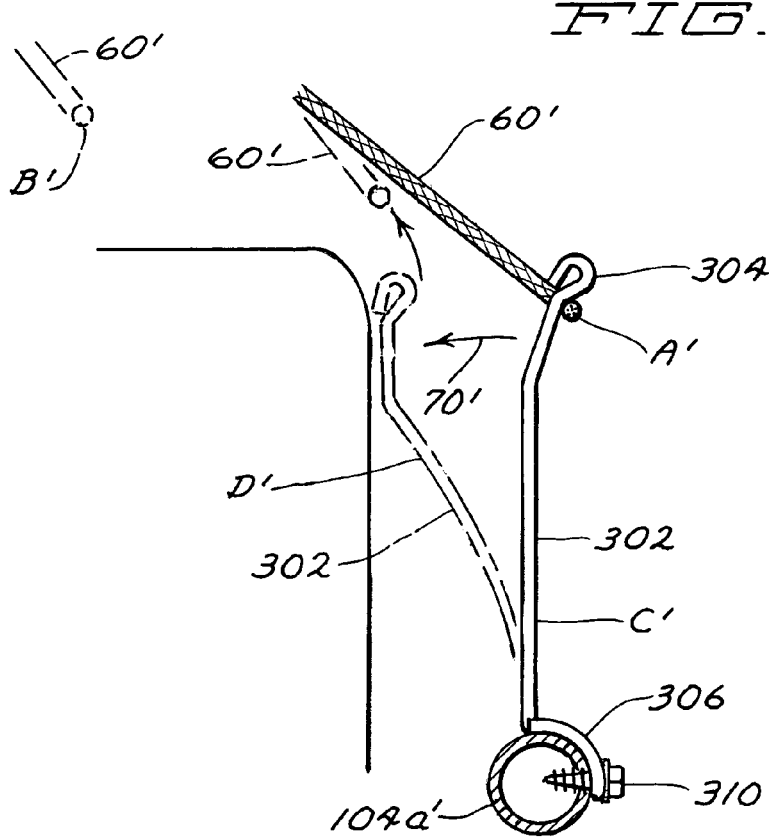
FIG. 8 is a cross-sectional view of the mower of FIG. 7 taken along line 8—8.

FIGS. 6, 7, and 8 illustrate a cord guide 302 in accordance with another embodiment of the invention. The cord guide 302 may replace the cord guide 202 in the cord guide system 200 described above with reference to mower 50.

As described further below, the cord guide 302 may function in a manner similar to the cord guide 202. However, the cord guide 302 may be designed for a hopper that sits at a higher elevation between the handle members than the hopper illustrated in FIGS. 1–2.

In one embodiment, the cord guide 302 is formed from a resilient, formed piece of metal as illustrated in FIG. 6. For instance, the cord guide 302 may be about ⅛ inch diameter music wire. Other materials, e.g., stainless steel, spring steel, or the like, are certainly possible without departing from the scope of the invention. Likewise, other diameters, or other cross-sectional shapes are also possible.

The guide 302 may form an open-sided hook having a catch portion 304 for holding a cord 60', and a base portion 306 for attaching to the handle attachment member 104a'. The cord guide 302 may form an elongate cantilevered member as shown in the figures. In the illustrated embodiment, the catch portion 304 may be configured to reduce sharp edges (e.g., bent in a closed loop 308).

The base portion 306 may be shaped to generally conform to the shape of the attachment member 104a'. A fastener 310 may be provided to engage a threaded receiving hole 312 on the attachment member 104a' and secure the guide 302 in place. In one embodiment, the base portion 306 may be secured to the attachment member 104a' with a single fastener 310. However, other embodiments may utilize different fastener configurations without departing from the scope of the invention. Alternatively, the base portion 306 of the guide 302 could couple to the attachment member 104a' without the use of fasteners, e.g., the base portion could be configured to engage the hole 312 directly.

FIG. 7 illustrates the guide 302 as it may be installed on a lawn mower 50' having a hopper 66'. The mower 50' and hopper 66' are substantially similar to the mower 50 and hopper 66 already described above (see FIGS. 1 and 2), except that the hopper 66' sits a higher elevation between the attachment members as shown in FIG. 7. The cord guide 302 operates in conjunction with the pull grip bracket (see 110 in FIG. 1) to form a cord guide system 300 that is also similar to the system 200 described above.

During mower operation, the cord 60' may be in a second or operating configuration B' (see FIG. 8). However, once the hopper 66' becomes filled with clippings, the mower 50' (engine) may be stopped and the cord 60' moved to a non-interfering first configuration A'. This may be accomplished by manually grasping the cord 60' in the proximity of the guide 302 and pulling enough cord slack from the recoil starter (not shown) to permit hooking of the cord 60' over the catch portion 304 of the guide as shown in FIGS. 6-8. The guide 302 is preferably capable of holding the cord 60' in the first non-interfering configuration A' during the hopper removal/replacement process. The operator may then lift the hopper 66', e.g., using the handle 68', upwardly through the space defined between the handle members (only one handle member 104a' illustrated in the FIG. 7) and empty the hopper contents.

Once the hopper 66' is reattached, the operator may apply the pulling force to the cord 60' (see, e.g., the pulling force 64 of FIG. 2). As the pulling force is applied, the cord 60' applies an inward force (in the direction indicated by reference numeral 70' in FIG. 8) to the cord guide 302. The pulling force preferably causes the guide 302 to deflect or bend from position C' towards position D' (see FIG. 8) until the cord 60' is released by the guide 302, at which point the cord may return to the position defined by the second configuration B'. Further pulling of the pull grip 62 (see FIG. 1) may result in direct actuation of the mower starter without frictional resistance resulting from indirect routing around the guide 302.

Cord guide systems in accordance with embodiments of the present invention permit reconfiguration of the starter cord from an operating position, in which the cord lies over the collection hopper, to a non-interfering position, in which the cord is guided around the hopper. As a result, the hopper may be removed and reinstalled without interference from the cord. Embodiments of the present invention further permit returning of the cord to the operating position by application of a pulling force to the starter cord without requiring direct manual manipulation of the cord to remove it from the cord guide.

The complete disclosure of the patents, patent documents, and publications cited in the Background, the Detailed Description of Exemplary Embodiments, and elsewhere herein are incorporated by reference in their entirety as if each were individually incorporated.

Illustrative embodiments of this invention are discussed and reference has been made to possible variations within the scope of this invention. These and other variations, combinations, and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A lawn mower comprising:
    a movable housing comprising a prime mover, wherein the prime mover comprises a starter having a flexible cord attached thereto;
    a handle assembly extending upwardly and rearwardly from the housing, the handle assembly comprising a handle member transversely offset from a center of the bousing;
    a bracket coupled to the handle member; and
    a cord guide coupled to the handle member between the starter and the bracket, wherein the cord is movable from a first configuration, wherein the cord contacts the cord guide, to a second configuration, wherein the cord bypasses the cord guide and extends substantially directly between the bracket and the starter, the cord guide comprising a resilient member operable to deflect sufficiently to release the cord from the first configuration by application of a pulling force to a terminal end of the cord.

2. The mower of claim 1, wherein the cord guide comprises an open-sided hook member.

3. The mower of claim 2, wherein the hook member comprises plastic.

4. The mower of claim 2, wherein the hook member comprises music wire.

5. The mower of claim 1, wherein the cord guide is attachable to the handle member with a fastener.

6. A lawn mower comprising:
a movable housing comprising a prime mover operable to power a cutting element supported by the housing, wherein the prime mover further comprises a starter having a starter cord;
a handle assembly extending upwardly and rearwardly from the housing, the handle assembly comprising transversely offset first and second handle members;
a vertically-displaceable collection hopper positioned between the first and second handle members;
a bracket coupled to the first handle member; and
a resilient cord guide coupled to the first handle member between the bracket and the starter;
wherein the cord is movable between a first configuration, wherein the cord extends around the cord guide between the starter and the bracket, and a second configuration, wherein the cord extends above the collection hopper substantially directly between the starter and the bracket, the cord guide operable to deflect sufficiently to release the cord from the first configuration by application of a pulling force to the cord.

7. The mower of claim 6, wherein the cord guide comprises plastic.

8. The mower of claim 6, wherein the cord guide comprises an elongate cantilevered member.

9. The mower of claim 8, wherein the elongate cantilevered member comprises music wire.

10. The mower of claim 8, wherein the elongate cantilevered member is attachable to the first handle member with a fastener.

11. The mower of claim 6, wherein the cord terminates at a pull grip proximate the bracket.

12. The mower of claim 6, wherein the bracket is positioned proximate an upper portion of the handle assembly.

13. The mower of claim 6, wherein the cord guide comprises a resilient material.

14. A lawn mower comprising:
a movable housing comprising a prime mover operable to power a cutting element supported by the housing, wherein the prime mover further comprises a starter having a starter cord;
a handle assembly extending upwardly and rearwardly from the housing, the handle assembly comprising spaced-apart first and second handle members;
a vertically-displaceable collection hopper positioned between the first and second handle members;
a bracket coupled to the first handle member; and
a cord guide coupled to the first handle member between the bracket and the starter;
wherein the cord, when in a first configuration, is operable to engage the cord guide such that the card does not interfere with vertical movement of the collection hopper, and, when in a second configuration, is operable to extend over the collection hopper between the bracket and the starter, and wherein the cord guide comprises a resilient material and is deflectable to release the cord from the first configuration upon application of a pulling force to a terminal end of the cord.

15. The mower of claim 14, wherein the cord guide comprises a plastic hook.

16. A lawn mower comprising:
a movable housing comprising a prime mover operable to power a cutting element supported by the housing, wherein the prime mover further comprises a starter having a starter cord;
a handle assembly extending upwardly and rearwardly from the housing, the handle assembly comprising transversely offset first and second handle members;
a vertically-displaceable collection hopper positioned between the first and second handle members;
a bracket coupled to the first handle member; and
a cord guide coupled to the first handle member between the bracket and the starter, wherein the cord guide comprises:
a first portion for coupling to the first handle member, the first portion comprising a first material; and
a second portion for contacting the cord, wherein the second portion comprises a second material having greater compliance than the first material;
wherein the cord is movable between a first configuration, wherein the cord extends around the cord guide between the starter and the bracket, and a second configuration, wherein the cord extends above the collection hopper substantially directly between the starter and the bracket, the cord guide operable to deflect sufficiently to release the cord from the first configuration by application of a pulling force to the cord.

17. The mower of claim 16, wherein the first portion of the cord guide is molded with the second portion.

18. The mower of claim 16, wherein the first portion of the cord guide comprises a protrusion to assist with coupling the cord guide to the first handle member.

* * * * *